US012601915B2

(12) United States Patent
Krawczyk et al.

(10) Patent No.: US 12,601,915 B2
(45) Date of Patent: Apr. 14, 2026

(54) DISPLAY SYSTEM AND LIGHT CONTROL ELEMENT THEREFOR

(71) Applicant: Envisics Ltd, Milton Keynes (GB)

(72) Inventors: Celedonia Krawczyk, Milton Keynes (GB); Yiren Xia, Milton Keynes (GB); Timothy Smeeton, Milton Keynes (GB); Jamieson Christmas, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 324 days.

(21) Appl. No.: 18/362,499

(22) Filed: Jul. 31, 2023

(65) Prior Publication Data

US 2024/0069340 A1 Feb. 29, 2024

(30) Foreign Application Priority Data

Aug. 31, 2022 (GB) ..................................... 2212670

(51) Int. Cl.
*G02B 27/01* (2006.01)
*G02B 27/00* (2006.01)
*G02B 27/10* (2006.01)

(52) U.S. Cl.
CPC ..... *G02B 27/0103* (2013.01); *G02B 27/0081* (2013.01); *G02B 27/1026* (2013.01); *G02B 2207/123* (2013.01)

(58) Field of Classification Search
CPC ........... G02B 27/0103; G02B 27/0081; G02B 27/1026; G02B 2207/123; G02B 27/0018; G02B 2027/0125; G02B 27/0101; G02B 2027/0118; G02B 27/0172; G02B 2027/0107; G02B 2027/0109; G02B 27/01; G02B 27/00; G02B 27/10;
(Continued)

(56) References Cited

U.S. PATENT DOCUMENTS

2003/0107803 A1* 6/2003 Tanaka ................. G03B 21/625
359/460
2019/0384057 A1 12/2019 Mori
(Continued)

FOREIGN PATENT DOCUMENTS

CN     108292047 A     7/2018
DE     102018213061 A     1/2020
(Continued)

OTHER PUBLICATIONS

Combined Search and Examination Report in United Kingdom, Patent Application No. GB2212670.0, dated Mar. 3, 2023.

*Primary Examiner* — Thomas K Pham
*Assistant Examiner* — Kuei-Jen L Edenfield
(74) *Attorney, Agent, or Firm* — McDonnell Boehnen Hulbert & Berghoff LLP

(57) ABSTRACT

A display system and light control layer is described. The display system includes an optical component having a reflective surface. A light control layer is disposed on a first surface of the optical component on an optical path of sunlight to the reflective surface. The light control layer includes a louvre structure including an array of louvres. Each louvre is arranged at an orientation angle relative to the first surface. The separation between adjacent/neighbouring louvres is such that the distal end/edge of one louvre overlaps the proximal end/edge of the adjacent/neighbouring louvre.

19 Claims, 16 Drawing Sheets

(58) Field of Classification Search
CPC .............. G02B 2027/015; G03H 1/04; G03H
2223/24; G03H 2223/50; B60K 35/22;
B60K 35/234; B60K 35/235
USPC ... 359/1, 245, 615, 237, 831, 883, 547–582;
428/332
See application file for complete search history.

(56)                       References Cited

U.S. PATENT DOCUMENTS

| | | |
|---|---|---|
| 2020/0103650 A1 | 4/2020 | Woods |
| 2021/0157136 A1 | 5/2021 | Nam |
| 2022/0219538 A1 | 7/2022 | Hirata |
| 2023/0168499 A1* | 6/2023 | Wille ................. G02B 27/0101 |
| | | 359/613 |
| 2023/0176375 A1 | 6/2023 | Wolf |

FOREIGN PATENT DOCUMENTS

| | | |
|---|---|---|
| DE | 102020211662 B | 7/2021 |
| WO | 2021219173 A1 | 11/2021 |

* cited by examiner

300

540

520

526b 524b        524a

526a

522

530

630

V

D

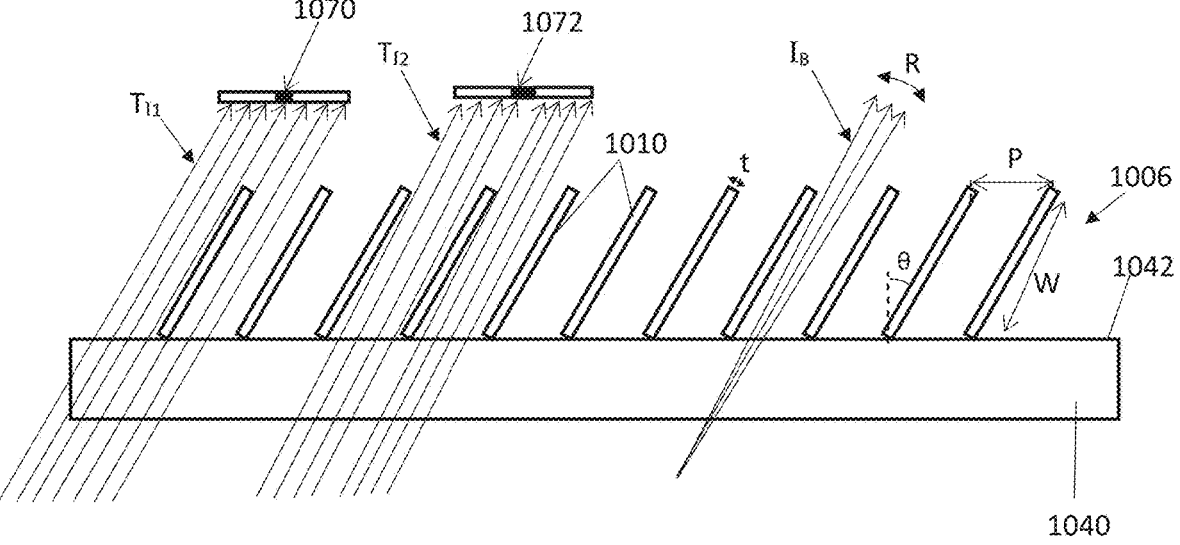
FIGURE 10
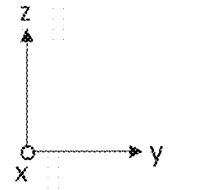

DISPLAY SYSTEM AND LIGHT CONTROL ELEMENT THEREFOR

CROSS-REFERENCE TO RELATED APPLICATIONS

This application claims the benefit of priority of United Kingdom Patent Application No. 2212670.0 filed Aug. 31, 2022, which is hereby incorporated herein by reference in its entirety.

FIELD

The present disclosure relates to a display system. More specifically, the present disclosure relates to a display system comprising a waveguide pupil expander and to a method of pupil expansion using a waveguide. The present disclosure further relates to a light control layer for an optical component of a display system, such as a waveguide pupil expander. Some embodiments relate to a picture generating unit and a head-up display, for example an automotive head-up display (HUD).

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

There is provided a display system comprising an optical component having a reflective surface. The optical component may be arranged, during display operation, in a configuration such that sunlight is incident on the reflective surface. It may be said that the optical component is a source or potential source of sunlight glare. That is, the optical component is arranged such that, in the absence of at least one countermeasure, it can cause glare—i.e. it can reflect sunlight (i.e. at least one sunlight angle) onto an optical path that directly or indirectly reaches/intersects a viewing window (e.g. eye-box) of the display system. In other words, the optical component (or at least a first surface thereof) forms or creates (by reflection therefrom) at least one direct or indirect optical path for sunlight (i.e. at least one sunlight angle) to the viewing window (e.g. eye-box) of the display system. The display system further comprises a light control layer disposed on a first/planar surface of the optical component on an optical path for sunlight to the reflective surface. The light control layer comprises a louvre structure having an array of louvres. Each louvre has a sidewall with a width (height) defined between a proximal end/edge adjacent that first/planar surface and a distal end/edge and an orientation angle to a plane of the surface normal to the first/planar surface. A pitch between adjacent louvres of the louvre structure is such that the distal end/edge of one louvre overlaps the proximal end/edge of the adjacent louvre. That is, a footprint of a first louvre on the first surface overlaps with a footprint of a second louvre on the first surface, wherein the first louvre is immediately adjacent the second louvre in the array of louvres. Alternatively, it may be said that a projection of the first louvre onto the first surface overlaps with a projection of the second louvre onto the first surface. In some embodiments, the light control layer is a glare countermeasure such as a reflection suppression component.

The amount of overlap (e.g. distance) or the degree of overlap (percentage overlap) between adjacent louvres may be constant for the array of louvres. Alternatively, the amount or degree of overlap may be variable, for instance according to position within the array of louvres.

The louvres of the array of louvres comprises a material having one or more of: high absorption; high attenuation; low specular reflectivity, and high diffusivity of light. The person skilled in the art of optics appreciates what constitutes "high" and "low" in relation to the optical properties of a material. In some embodiments, the term "high" means greater than 80% such as greater than 90% or 95% and the term "low" means less than 20% such as less than 10% or 5%. For example, the term "high attenuation" may mean that the intensity of incident light (e.g. sunlight) is attenuated (i.e. reduced) by at least 95%.

The louvre structure comprises a one-dimensional array of parallel longitudinal slats, each slat having a length, width (height) and a thickness. It should be understood that the louvres/louvre slats have fixed positions in the array and remain static in use. In some embodiments, the slats have a uniform thickness. In other embodiments, the slats may vary in thickness, for example the thickness may be tapered along their width from the proximal end/edge to the distal end/edge.

The louvre slats may extend longitudinally in a first dimension, and may be spaced apart in a second dimension, orthogonal to the first dimension. The first and second dimensions may correspond to the dimensions of the first/planar surface of the optical component.

The separation between adjacent louvre slats in the second dimension may be defined as the pitch. In some arrangements the pitch may be for all louvre slats of the array. It may be said that the spacing or periodicity of the louvres is uniform for the array. In other arrangements, the pitch may vary between slats of the array, such as from a first end to a second end of the array. It may be said that the spacing or periodicity of the slats of the array is non-uniform for the array. This may enable the overlap between louvres to be varied according to position within the array.

In some arrangements, the angle of the (sidewalls of the) louvres/louvre slats may be uniform (i.e. constant) across the array in the second dimension. In other arrangements, the angle of the (sidewalls of the) louvres/louvre slats may vary across the array, such as from a first end to a second end of the array in the second dimension. This may enable the overlap between louvres to be varied according to position within the array, in addition or alternatively to variation of the louvre pitch.

The (sidewall) width of each slat—between the proximal end/edge and the distal end/edge thereof—may generally extend in third dimension, orthogonal to the first and second dimensions. The slats (or slat sidewalls) may be orientated (inclined) at an angle to the first/planar surface (or surface normal thereto), so that the distal end/edge of one slat overlaps the proximal end/edge of the adjacent slat in the second dimension.

Owing to the angled orientation and overlap of (sidewalls of) adjacent slats in the second dimension, rays of sunlight that follow an optical path to the first/planar surface and/or the reflective surface that passes between the louvres/louvre slats, are reflected back onto an optical path that is blocked by at least one louvre/louvre slat. Thus, sunlight reflected by the first/planar surface and/or reflective surface of the optical component is absorbed or attenuated (e.g. diffusely scattered) by the louvre/louvre slat instead of being specularly reflected towards a viewing area of the display system. At the same time, image light from the display system may pass between the louvres/louvre slats without any deviation from its optical path to the viewing area. The term "image light" is used herein as shorthand for the image-forming or spatially modulated light output by the display device. That is, the light that forms the image perceived by a viewer in the viewing area. In accordance with the present disclosure, the image light comprises a holographic wavefront. The holographic wavefront may comprise diverging light ray bundles forming a virtual image (upstream of the display device) and/or converging light ray bundles forming a real image (downstream of the display device). The inventors have found that the reflection suppression component disclosed herein is particularly effective when the image light is a holographic wavefront or holographic light field. Most notably, the component is effective when the hologram is a so-called channeling hologram as described below. It has been found by simulation and verified experimentally that the louvre structure of this disclosure can be configured to reduce glare whilst not adversely affecting the holographic process associated with a channeling hologram, and thus the image quality at the viewing area/eye-box.

In some embodiments, the array of louvres comprises louvres/louvre slats that are spatially separated by air. In other embodiments, the array of louvres includes a transparent structure between adjacent louvres/louvre slats of the array. In these embodiments, the transparent structure is configured (shaped) to allow image light from the display system to pass through the structure between the louvres/louvre slats, without any deviation from its optical path to the viewing area. The transparent structure may improve the structural and functional integrity of the louvre structure, so that it is more robust (less easily damaged) and may be more easily cleaned. The transparent structure may comprise parallel light transmission surfaces.

In embodiments, the optical component is a waveguide pupil expander. The light control layer is disposed on the exit surface of the waveguide pupil expander forming the output port for image light from the display system towards the viewing area thereof. For example, the waveguide pupil expander may comprise a pair of parallel reflective surfaces arranged for internal reflection and waveguiding of image light of the display system. The pair of parallel reflective surfaces comprises a first fully reflective surface and a second partially reflective-partially transmissive surface forming the exit surface. The exit surface may be the planar surface, the reflective surface of the optical component or both.

The thickness of the louvres/louvre slats of the array of louvres may be chosen to minimise the occluded areas of image light at the exit surface/output port of the optical component (e.g. pupil expander). In particular, the thickness of each louvre slat extends in the second dimension and may block light rays of output image light leading to occluded areas. Accordingly, the louvres/louvre slats should be as thin as possible (i.e. the thickness should be minimised) in order to minimise the size of the occlusion of output image light (in the second dimension), whilst still ensuring sufficient absorption or attenuation of reflected sunlight.

The orientation of the louvre slats (or louvre sidewalls) may be chosen to maximise the transmission of image light to the viewing area. In some embodiments, the angle (measured in a plane with respect to the first/planar surface (or surface normal thereto)) may be between the maximum and minimum angle of output image light from the display system. For example, the louvres may be orientated at an angle parallel to the angle of light rays of image light at the midpoint between the maximum and minimum angles of output image light. A midpoint orientation minimises the size of the occluded areas for both the highest and lowest angles of light rays of the image light.

In some examples, the angle of the louvres/louvre slats (or louvre sidewalls) is in the plane containing the so-called "gut ray" (i.e. central/projection axis of light ray bundles) of the image light output by the display system.

In other examples, the angle of the louvres/louvre slats (or louvre sidewalls) varies according to position in the array and/or corresponding position on the first/planar surface. For example, the orientation angle of the louvre slats (or louvre sidewalls) may depend on the angle of image light emitted from the corresponding area of the exit surface of the waveguide expander. This may combine synergistically with the diffracted light field comprising diverging ray bundles having angular channeling, as described herein.

Owing to curvature of the windscreen, which forms an optical combiner for image light and light from the real word scene in an automotive HUD, to deliver the full image light (FOV) to the top of the viewing area, a first range of angles of light is emitted from a first region of the waveguide pupil expander. Similarly, a second range of angles of light is emitted from a second region of the waveguide pupil expander to deliver the full image light (FOV) to the bottom of the viewing area. Therefore, the midpoint (optimum) louvre slat orientation (midpoint between maximum and minimum ray angles) varies with position across the plane surface (surface of the pupil expander).

The spacing (or pitch) of the louvres/louvre slats in the array of louvres is chosen to minimise diffractive effects on the wavelengths of the image light in order to avoid adversely affecting the quality of the image at the viewing area. Typically, the image light comprises visible wavelength, such as red, green and blue wavelengths output by laser light sources. In some examples, the thickness of the louvres/louvre slats is in the region of 2 to 250 μm, preferably 20 to 100 μm, and the pitch (spacing interval) between the louvre slats is in the range of 0.5 to 3 mm, preferably 1-2 mm (for a distance of approximately 1 metre between the louvres structure and the viewing area—the skilled person will appreciate that a larger pitch may be required for a greater distance to the viewing area).

In embodiments comprises a transparent structure between the light absorbing or attenuating louvres/louvre slats, the sunlight receiving surface may be configured (shaped) to prevent specular reflection towards the viewing area.

In some examples, the transparent structure has parallel planar sidewalls/sidewall surfaces where the slope of the surfaces is high enough such that sunlight incident on the louvre structure from any direction cannot be specularly reflected, either directly from the transparent structure or the first/planar or reflecting surface of the optical combiner, to the viewing area or indirectly to the viewing area, such as via an optical combiner (e.g. windscreen of an automotive HUD) of the display system. The use of planar surfaces ensures (all the rays of) the image light may propagate through the transparent structure without deviation from its optical path to the viewing area. This prevents distortion of the image at the viewing area.

In other examples, the transparent structure may comprise at least one curved surface, such that the slope of the sidewalls/sidewall surfaces at all positions is high enough to prevent specular reflection of sunlight incident thereon to the viewing area. For example, the transparent structure may comprise two opposed sidewall surfaces having configurations that are optimised to prevent specular reflection of sunlight to the viewing area whilst allowing the propagation of image light therethrough without deviation to the viewing area.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illu-minating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 10 is a schematic side view showing the occlusions that may be formed in the image light field output by a display system;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
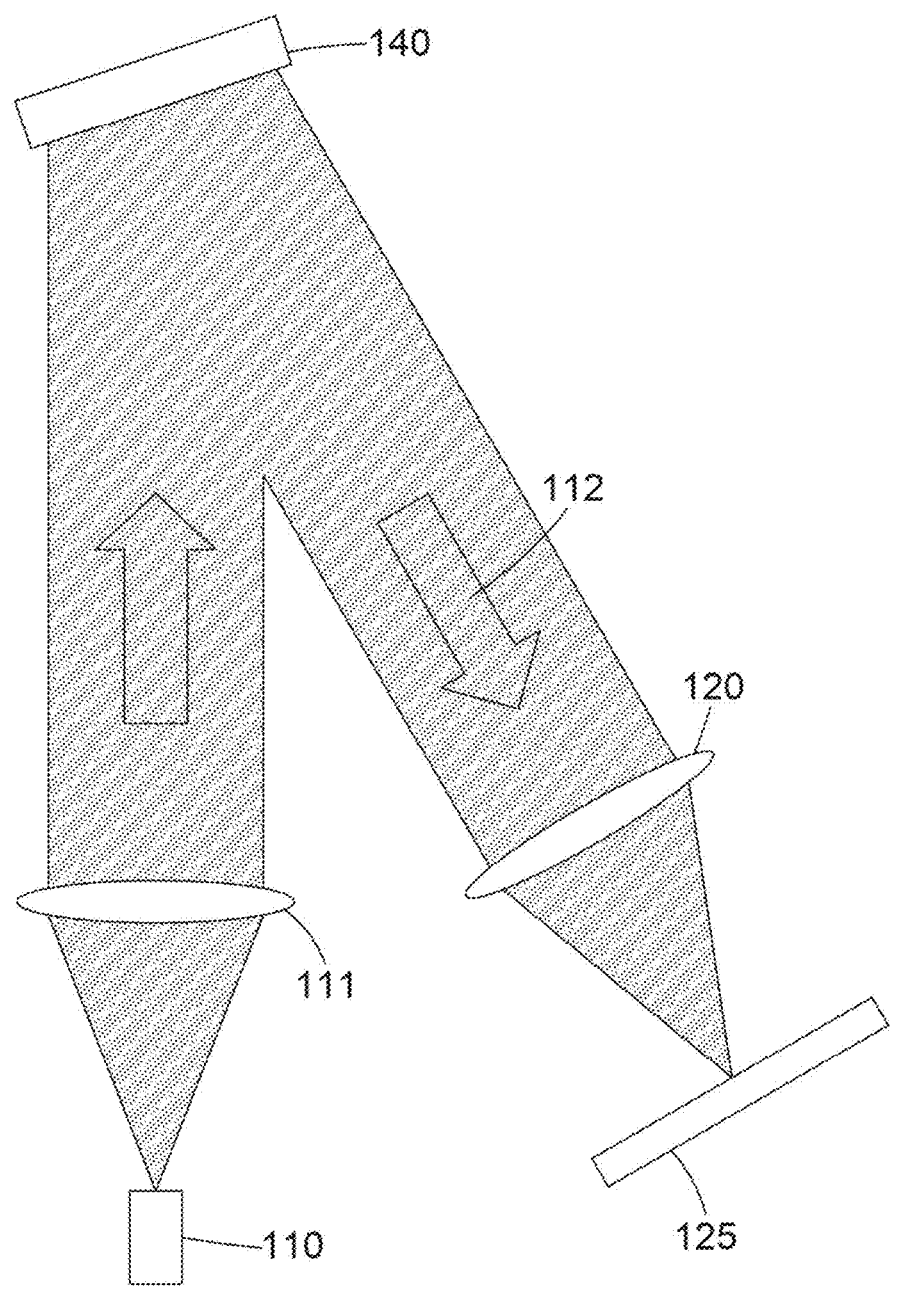
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 (published as GB2603517A) and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 August 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View and/or Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling in the Hologram Domain

The hologram formed in accordance with some embodiments, angularly-divides the image content to provide a plurality of hologram channels which may have a cross-sectional shape defined by an aperture of the optical system. The hologram is calculated to provide this channeling of the diffracted light field. In some embodiments, this is achieved during hologram calculation by considering an aperture (virtual or real) of the optical system, as described above.

Figure 2:
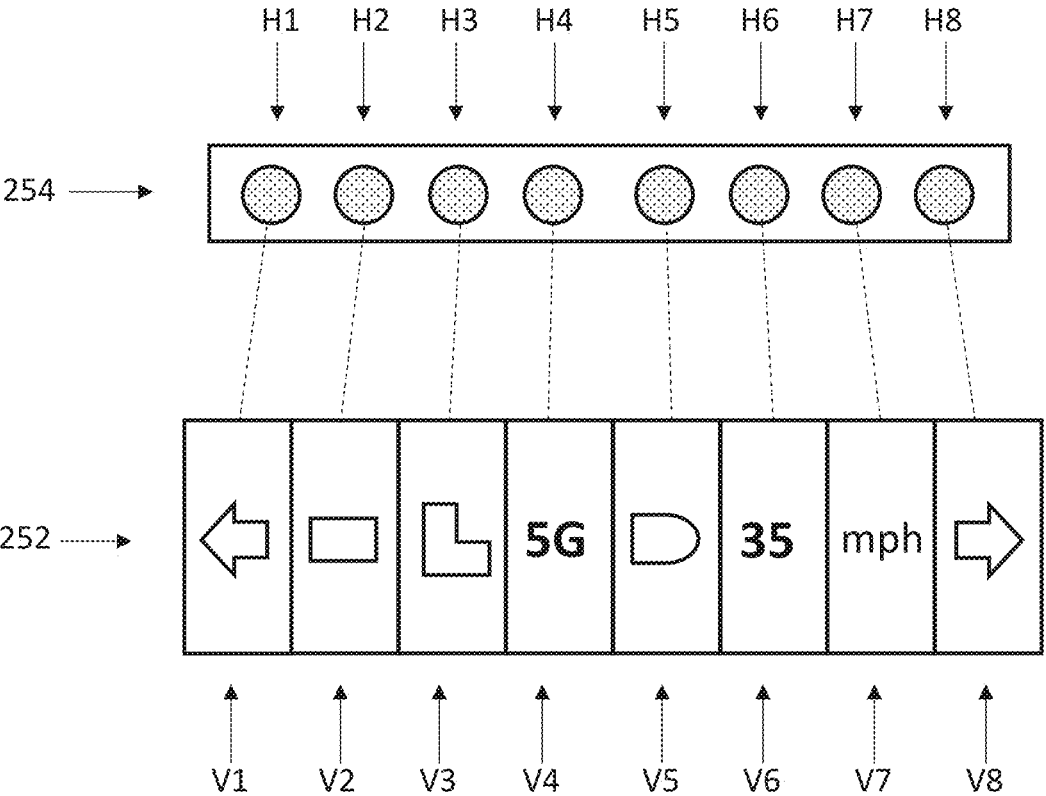
FIG. 2 shows an image for projection comprising eight image areas/components, V1 to V8, and cross-sections of the corresponding hologram channels, H1-H8.
Figure 3:
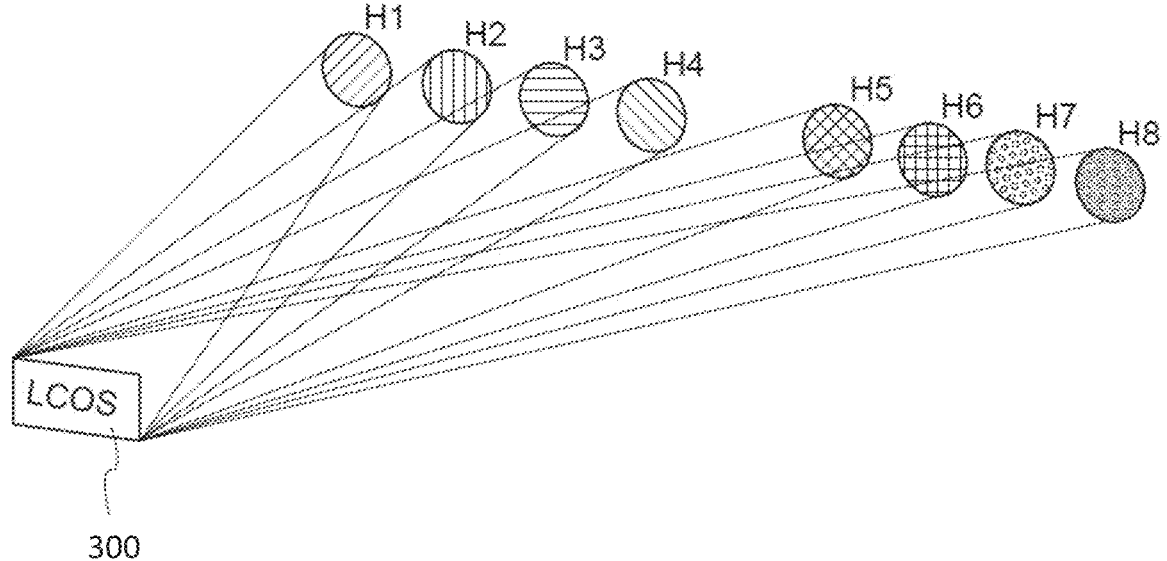
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram 300 in this example directs light into a plurality of discrete areas H1 to H8. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
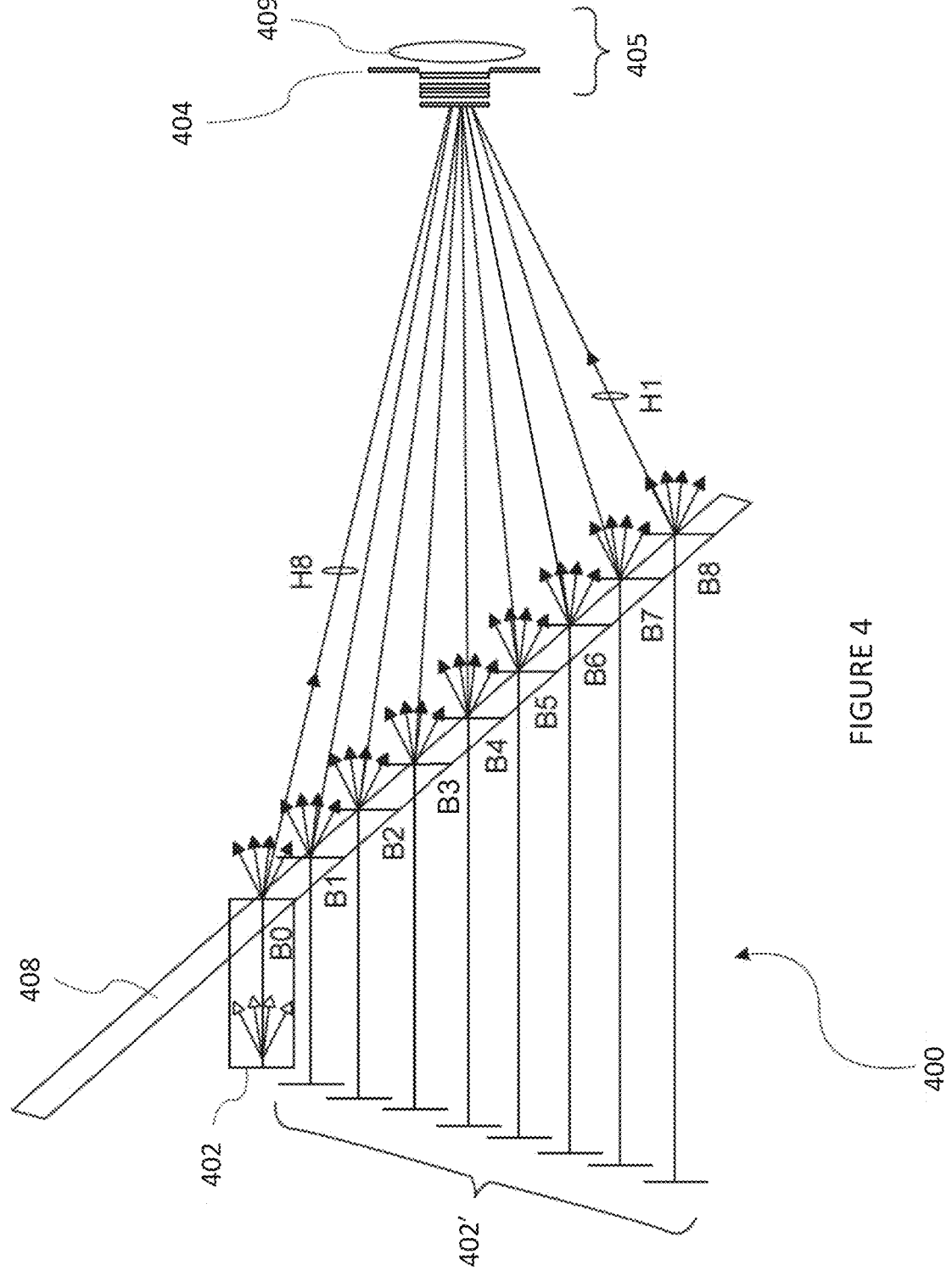
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 408 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
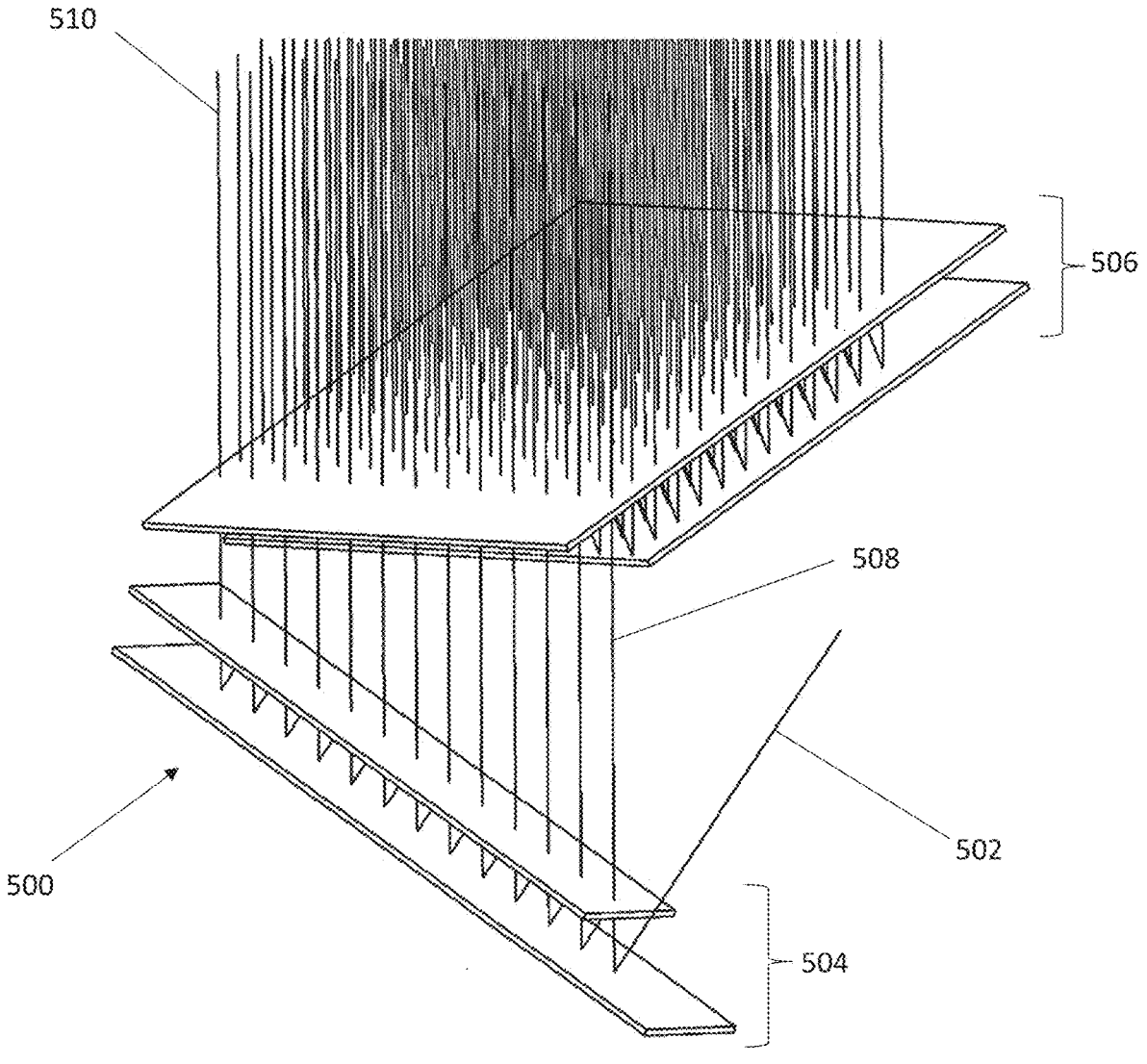
FIG. 5A shows a perspective view of a conventional two-dimensional pupil expander comprising two replicators.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are sub-stantially elongate in one direction. The collimated light beam 502 is directed towards an input on the first replicator

504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replica-tion—or, pupil expansion—by expanding each of those light beams in a second direction, substantially orthogonal to the first direction. The first pair of surfaces are similarly (in some cases, identically) sized and shaped to one another and are substantially rectangular. The rectangular shape is imple-mented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plural-ity of light beams 510 may be regarded as comprising a two-dimensional grid, or array, of replica light beams.

Thus, it can be said that the first and second replicators 504, 506 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflec-tive surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
FIG. 5B shows a perspective view of a first example two-dimensional pupil expander comprising two replicators.

FIG. 5B shows a perspective view of a system 500 comprising two replicators, 520, 540 arranged for replicat-ing a light beam 522 in two dimensions, in which the first replicator is a solid elongated waveguide 520 and the second replicator is a solid planar waveguide 540. Replicator 520 has elongate parallel reflective surfaces 524a and 524b, as well as two other surfaces 526a and 526b.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

Reflection Suppression to Mitigate Glare

In operation, the transmission/exit surface (i.e. expanded exit pupil) of the second replicator 506 of the two-dimensional pupil expander of FIG. 5A forms an external surface or "output port" from which image light is transmitted through air to an eye-box area for viewing. Accordingly, the transmission surface may be exposed to sunlight from the environment in which the head-up display is used. Received sunlight may cause glare to the viewer, in particular due to reflections of sunlight associated with the pupil expander 506 and/or a turning film, if used in conjunction with the pupil expander 506. For example, glare may arise if rays of sunlight are directly reflected from the external transmission surface, or other surfaces of the pupil expander 506, at angles such that rays of sunlight follow an optical path directly to the viewing area/eye-box. This is described herein as "direct glare".

In another example, glare may arise if sunlight is coupled into the pupil expander 506 at angles such that rays of sunlight follow the same optical path within the pupil expander as rays of image light, or are otherwise reflected by surfaces thereof, in order to reach the viewing area/eye-box indirectly (e.g. via an optical combiner, such as a vehicle windscreen). This is described herein as "veiling glare".

Figure 6A:
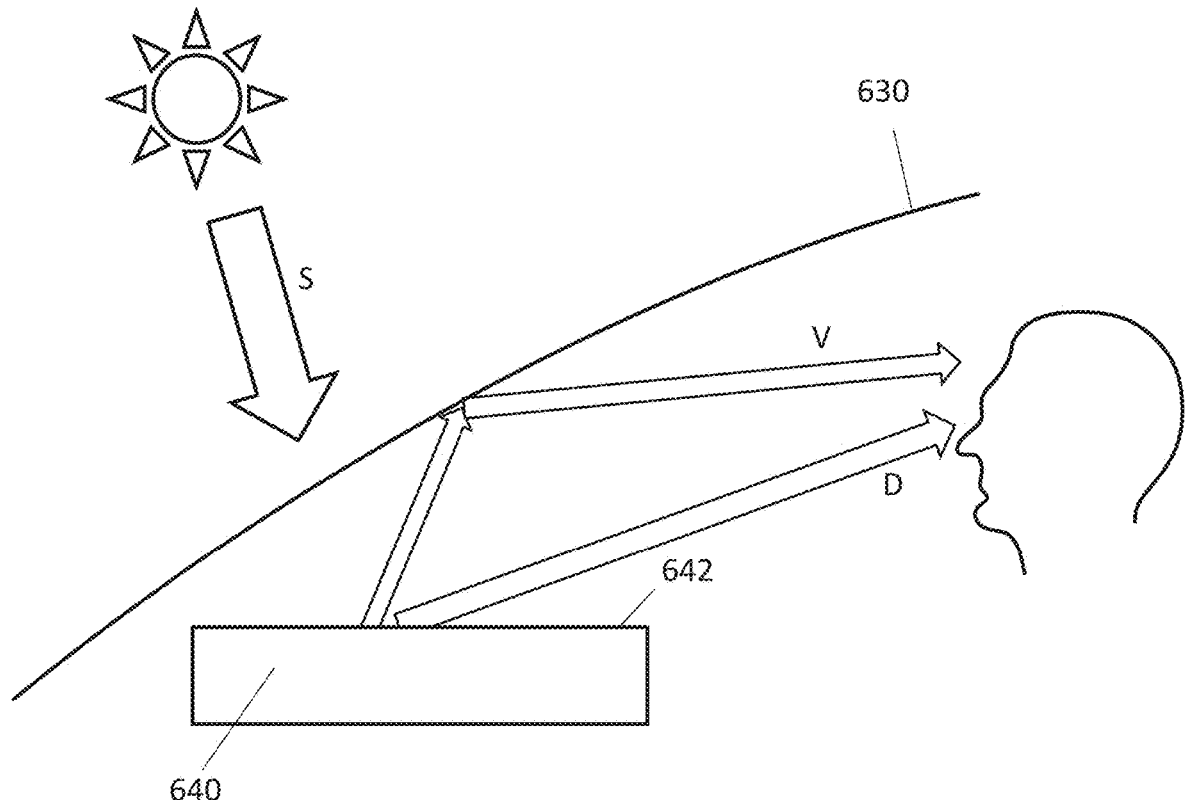
FIGS. 6A and 6B are schematic views of an automotive head-up display system showing potential areas of sunlight glare.
Figure 6B:
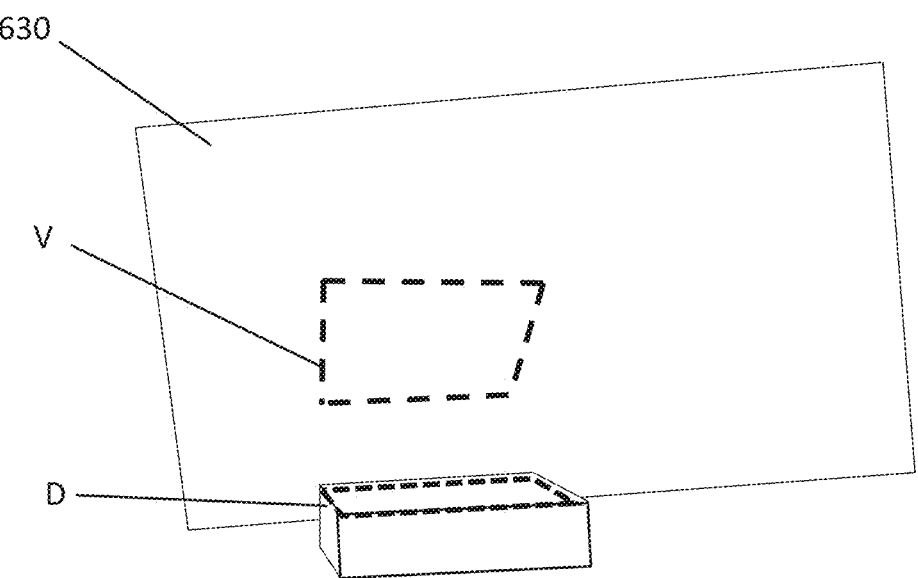

FIG. 6A shows the optical path of rays of sunlight S incident on the transmission/exit surface 642 of a (bulk optic) waveguide pupil expander 640 of a head-up display (HUD) in an automotive application. In particular, sunlight S at a relatively high elevation angle to the horizon is incident through a vehicle windscreen 630 onto the external transmission/exit surface 642 of the pupil expander 640. In the example, the transmission/exit surface 642 is located in a substantially horizontal plane in an aperture in the vehicle dashboard (not shown). Some sunlight rays D may be directly reflected from the pupil expander 640 (e.g. by one or more reflective layers thereof) towards the viewing area/eye-box and cause "direct glare". Some other light rays V may be indirectly reflected from the pupil expander 640 (e.g. by one or more reflective layers thereof) towards the viewing area/eye box, via the windscreen 730 and cause "veiling glare". Thus, light rays V may follow the same optical path(s) as image light output from the pupil expander 640. In either case, the glare arising from reflected sunlight may be harmful to the viewer/driver. FIG. 6B shows the view at the viewing area/eye-box indicating the areas of the windscreen and dashboard, from which the viewer/driver may receive sunlight glare. An area of direct glare D is seen at the exit/transmission surface in the vehicle dashboard (not shown) and an area of viewing glare V is seen at the vehicle windscreen. The skilled person will appreciate that the presence of glare from different positions within the illustrated areas D and V at a particular point in time may depend on the elevation angle of the sun and the configuration of the display system (both internally and in situ).

Light Control Layer

Accordingly, the inventors propose using an optical component comprising a light control layer over the transmission surface of the second replicator/pupil expander, or more generally the output port of the HUD, to reduce the risk of glare to the viewer. An example light control layer for controlling the direction of received sunlight comprises a plurality of parallel louvres formed of a light absorbing, light attenuating or similar material. The inventors have recognized that a one-dimensional array of louvres, typically in the form of longitudinal rectangular-shaped louvre slats, may be used to control the direction and/or suppress reflections of sunlight that may be incident on the transmission surface/output port of the HUD due to its upwardly facing/horizontal orientation in a vehicle dashboard adjacent the vehicle windscreen. The orientation (e.g., the side-wall angle(s)), pitch and geometry (e.g. length, width and thickness) of the louvres may be chosen to allow image light to be transmitted from the HUD at the desired range of angles necessary to reach the viewing area/eye-box.

Figure 7:
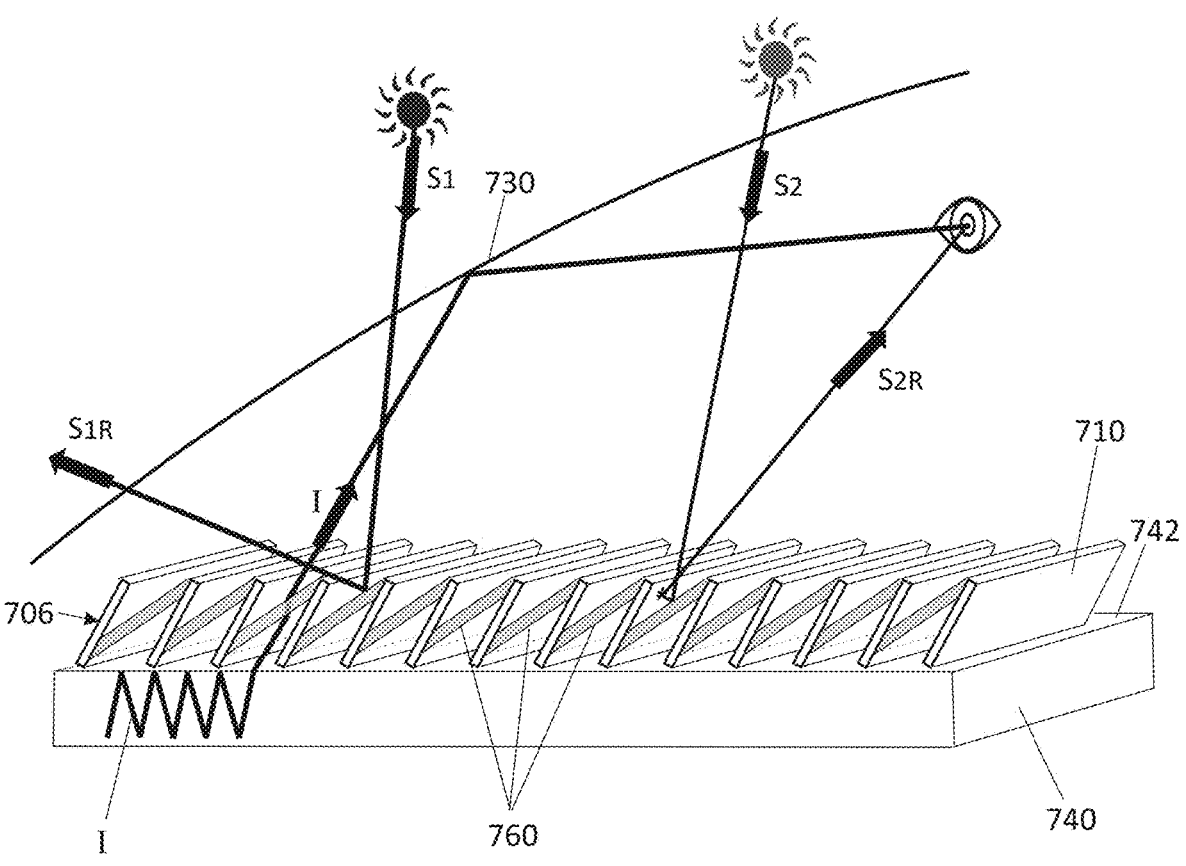
FIG. 7 is a schematic view of a light control layer formed on a transmission surface of a pupil expander of an automotive head-up display system in accordance with a first comparative example.
Figure 7:
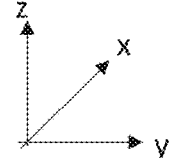

FIG. 7 shows a light control layer in the form of louvre structure 706 for reducing glare due to reflected sunlight in accordance with a comparative example. The louvre structure 706 comprises a plurality of parallel louvres/louvre slats 710 arranged in a one-dimensional array in a second dimension (illustrated as the y dimension). Thus, the length (long dimension) of the louvres/louvre slats 710 is parallel to a first dimension (illustrated as the x dimension), orthogonal to the second dimension, of the waveguide pupil expander 740. The louvre slats 710 comprise a light absorbing or light attenuating (e.g. light diffusing) material in order to block light rays incident thereon.

In the illustrated arrangement, the louvre structure 706 is disposed on a substantially planar transmission surface 742 forming the output port of a second replicator/waveguide pupil expander 740, which is arranged to internally reflect and replicate image light I to provide pupil expansion in the second dimension (illustrated as the y dimension). As shown in FIG. 7, in use, the transmission surface 742 of the waveguide pupil expander 740 is substantially horizontal and directly faces the windscreen 730 of a vehicle, which forms an optical combiner of the HUD display system. In the illustrated arrangement, the louvres/louvre slats 710 have a longitudinal rectilinear shape with parallel rectangular sidewalls. The (sidewalls of the) louvres/louvre slats 710 of the louvre structure 706 are arranged at an acute angle θ (i.e in a non-orthogonal plane) to the surface normal of the transmission surface. The angled orientation of the louvre slats 710 enables the light rays of the replicas of the image light I, which are formed and output by the waveguide pupil expander 740 at the transmission surface 742, to pass between the louvre slats 710 without deviation from the required optical path/s via the windscreen 730 to the viewing area/eye-box, as shown by the arrow for the rays of image light I. Thus, the angle θ is in the direction of the replicas of the image light I, and, thus, in the direction of pupil expansion by the waveguide pupil expander 740 (illustrated as from left to right in the y dimension). In other words, the louvre slats are inclined in the same direction as the propagation axes of the replicas of the image light, I, relative to the surface normal of the transmission surface 742.

In addition, optional transparent structures 760, having a similar longitudinal rectilinear shape to the louvre slats 710, are arranged at an angle between adjacent slats 710 (e.g. having a width (or cross-section) extending between near (e.g. substantially) the bottom of one louvre slat and near (e.g. substantially) the top of the adjacent louvre slat) so as to provide mechanical robustness to the louvre structure 706, and a protective cover of the transmission surface 742. An inclination angle of the transparent structures is therefore different to (e.g. greater than) the inclination angle θ of the louvre slats. The transparent structures 760 are configured (e.g. shaped) so that the light rays I of the image light output by the waveguide pupil expander 740 do not deviate from the required optical path (e.g. due to refraction at the surfaces thereof).

Accordingly, there is provided a light control layer arranged to be disposed on a first/planar surface of optical component of a display system, on an optical path for sunlight to the reflective surface of the optical component. The light control layer may be a glare countermeasure such as a reflection suppression component. The light control layer comprises a louvre structure having an array of louvres. Each louvre has a width defined between a proximal end, adjacent the first surface of the optical component, and a distal end. Each louvre is arranged at an orientation angle relative to the first surface of the optical component. The array of louvres includes a transparent structure between adjacent louvres/louvre slats of the array. The transparent structure may improve the structural and functional integrity of the louvre structure, so that it is more robust (less easily damaged) and may be more easily cleaned. The transparent structure may comprise parallel light transmission surfaces. The transparent structure may be configured (shaped) to allow image light from the display system to pass (out of optical component) through the structure between the louvres/louvre slats, without any deviation from its optical path to the viewing area. Example configurations of the transparent structure are disclosed herein with reference to FIGS.

7, 11, 12A and 12B. Other configurations will be apparent to the skilled person. There is further provided a display system comprising an optical component including the light control layer disposed on a first surface thereof.

In the comparative example, the light control layer formed by the louvre structure 706 may reduce sunlight glare to a viewer at the viewing area/eye-box. In particular, FIG. 7 shows rays of sunlight $S_1$ from the sun at a first elevation angle (with respect to the horizon) that pass though the windscreen 730 and are incident on the louvre structure 706. Some of these rays (not shown) of sunlight $S_1$ may be incident directly on the louvre slats 710 where the light is absorbed or attenuated without reaching the transmission surface 742. In addition, some of these rays (shown) of sunlight $S_1$ may be incident on the transparent structures 760 between the louvre slats 710 as shown. Owing to the configuration and orientation of the transparent structures 760, these rays of sunlight $S_1$ may be specularly reflected by one or more surfaces of the transparent structure 760 in a direction back through the windscreen 730, and thus reflected rays of sunlight $S_{1R}$ are directed on an optical path away from the viewing area/eye-box as shown by the arrow. FIG. 7 further shows rays of sunlight $S_2$ from the sun at a second elevation angle, which is higher/greater than the first elevation angle, that also pass though the windscreen 730 and are incident on the louvre structure 706. Owing to the configuration and orientation of the transparent structures 760, the rays of sunlight $S_2$ may be specularly reflected by one or more surfaces of the transparent structure 760 in a direction onto one of the louvres 710, and thus absorbed or attenuated. This blocks/reduces the intensity of reflected rays of sunlight $S_{2R}$ which may be directed towards the viewing area/eye-box as shown by the arrow. However, rays of sunlight $S_2$ that are incident on, and transmitted through, the transparent structures 760 may reach the transmission surface 742, as discussed below with reference to FIG. 8A.

Figure 8A:
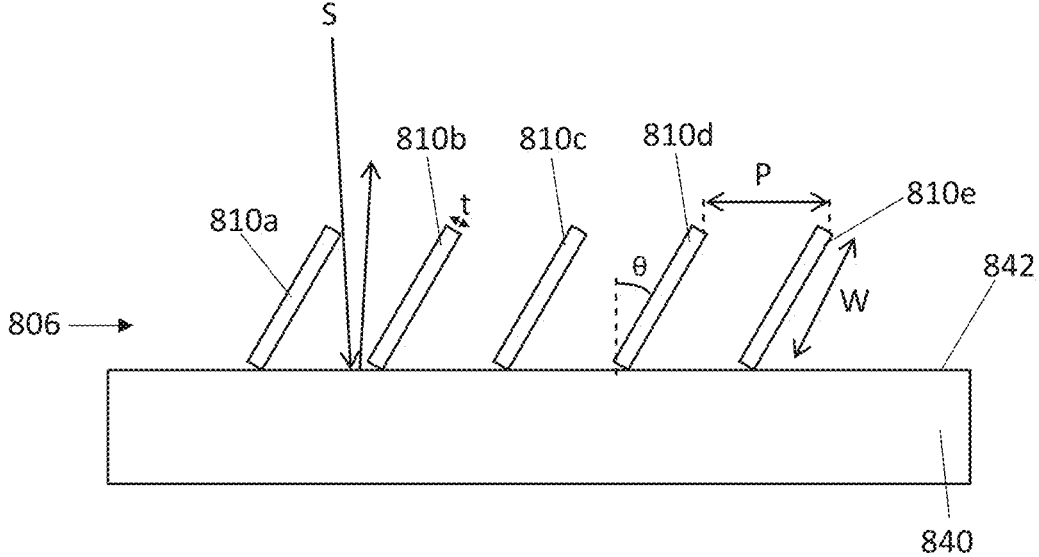
FIG. 8A is a side view of a light control layer formed on a transmission surface of a pupil expander of a display system in accordance with a second comparative example.
Figure 8A:
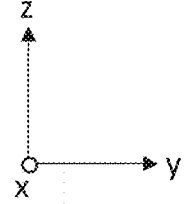

FIG. 8A shows a light control layer comprising a louvre structure 806 in accordance with another comparative example. The louvre structure 806 comprises a plurality of parallel louvres 810a-e arranged in a one-dimensional array on a substantially planar transmission surface 842 of a waveguide pupil expander 840, equivalent to the arrangement of FIG. 7. However, in contrast to the comparative example of FIG. 7, the array of louvres 810a-e is arranged in air such that there are no transparent structures between the louvres/louvre slats 810a-e. As shown in FIG. 8A, the transmission surface 842 lies in a plane in first and second orthogonal dimensions (illustrated as an x-y plane) and the louvres/louvre slats 810a-e are arranged in a one-dimensional array in the second dimension (illustrated as the y dimension). As the skilled person will appreciate, the pupil expander 840 performs pupil expansion, and thus forms replicas of image light (not shown) at the transmission surface 842, along a direction (illustrated from left to right) in the second dimension (illustrated as the y dimension). Thus, the light rays of the replicas of the image light may be output from the transmission surface 842 in the spaces between louvres/louvre slats 810a-e towards the viewing area/eye-box (not shown), as described with reference to FIG. 7.

Accordingly, there is provided a light control layer arranged to be disposed on a first/planar surface of optical component of a display system, on an optical path for sunlight to a reflective surface of the optical component. The light control layer may be a glare countermeasure such as a reflection suppression component. The light control layer comprises a louvre structure having an array of louvres.

Each louvre has a width defined between a proximal end, adjacent the first surface of the optical component, and a distal end. Each louvre is arranged at an orientation angle relative to the first surface of the optical component. The louvres of the array of louvres are separated by air so as to allow image light from the display system to pass (out of the optical component) through air between the louvres/louvre slats, without any deviation from its optical path to the viewing area. There is further provided a display system comprising an optical component including the light control layer disposed on a first surface thereof.

Similar to the arrangement of FIG. 7, each louvre 810$a$-$e$ of the louvre structure 806 comprises a longitudinal rectilinear louvre slat with parallel rectangular sidewalls (in cross section) defining a thickness t therebetween, which, in the illustrated arrangement, is a uniform thickness t. The sidewalls are rectangular and have a length (not shown), extending along the first dimension (illustrated as the x dimension), and a width w, extending at an inclination angle to a third dimension, orthogonal to the first and second dimensions (illustrated as the z dimension). Thus, the thickness t of the louvre slats extends in the second dimension (illustrated as the y dimension). As described above with referent to FIG. 7, the sidewalls of the louvres 810$a$-$e$ are orientated at a non-orthogonal angle relative to the planar transmission surface, as illustrated by angle θ with respect to the surface normal of the transmission surface 842. In addition, the louvres/louvre slats have a louvre pitch p corresponding to the spacing or separation between adjacent louvres 810 in the second dimension (illustrated as the y dimension). In the illustrated arrangement, the louvre pitch p is uniform across the array, such that all pairs of adjacent louvre slats have the same spacing. In other examples, the louvre pitch p may vary, for instance according to position along the length of the transmission surface in the second dimension (illustrated as the y dimension).

FIG. 8A shows the dimensions (e.g. thickness t and width w) and other parameters (e.g. orientation angle θ and pitch p) of the array of louvres/louvre slats 810$a$-$e$ of the louvre structure 806. In the illustrated arrangement, the combination of the width w and orientation angle θ of the louvre slats 810$a$-$e$ together with the pitch p between the louvre slats 810$a$-$e$ allows the passage of rays of sunlight S at some angles of elevation (e.g. at high angles of elevation) to be incident on the transmission surface 842 (e.g. at very small/ substantially normal angles of incidence) between adjacent louvres/louvre slats 810$a$-$e$. Thus, some of the rays of sunlight S may be specularly reflected from the transmission surface 842 as shown by the arrow of the incident/reflected ray of sunlight S between louvre slats 810$a$ and 810$b$. In addition, although not shown in FIG. 8A, some of the rays of sunlight S may pass into the waveguide pupil expander 840 and be internally reflected by surfaces thereof before passing out of transmission surface 840 between louvre slats 810$a$-$e$. In either case, there is a risk that the reflected sunlight may reach the viewing area/eye-box and cause glare because it reaches the transmission surface 842.

Embodiments of the present disclosure address some of the shortcomings of the first and second comparative examples, as discussed above.

First Embodiment—Overlapping Louvres

Figure 8B:
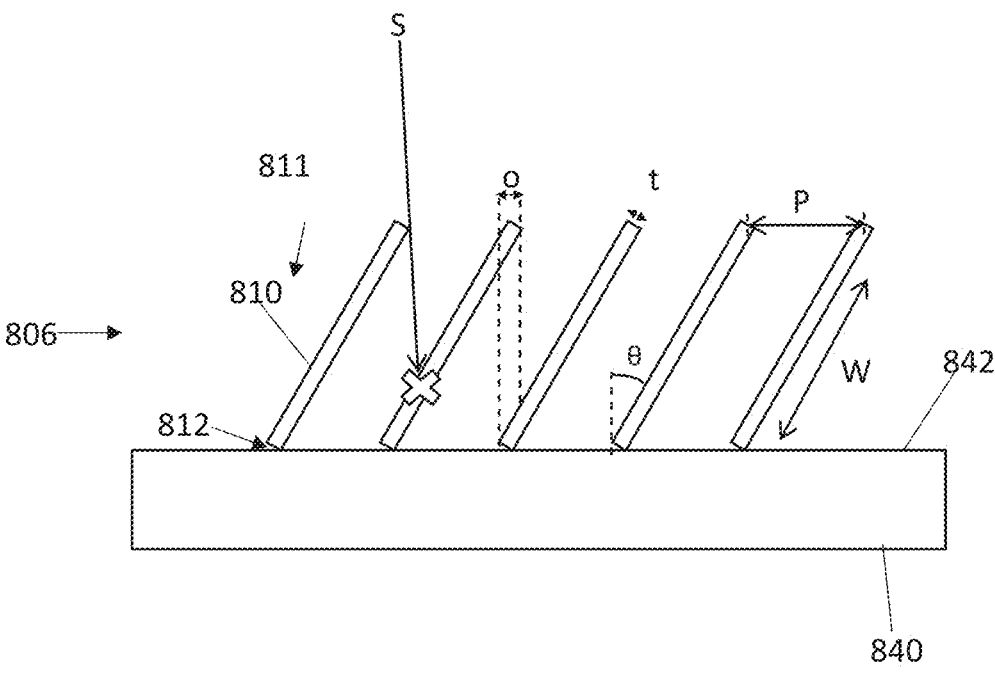
FIG. 8B is a side view, similar to FIG. 8A, of a light control layer formed on a transmission surface of the pupil expander of a display system in accordance with an embodiment showing incident sunlight from a first elevation angle.
Figure 8B:
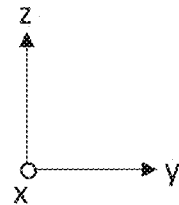

FIG. 8B shows a light control layer comprising a louvre structure 806 in accordance with an embodiment of the present disclosure. The louvre structure 806 comprises a one-dimensional array of louvres 810, which is equivalent the comparative example of FIG. 8A and so is not described in detail herein. However, in contrast to the comparative example of FIG. 8A, the dimensions (e.g. thickness t and width w) and other parameters (e.g. orientation angle θ and pitch p) of the array of louvre slats 810$a$-$e$ of the louvre structure 806 are chosen to further mitigate the risk of sunlight glare (both direct glare and veiling glare).

In particular, as shown in FIG. 8B, the pitch p between the louvres, the orientation angle θ and/or the width w of the louvres 810 is selected such that there is an overlap (or overhang) between adjacent louvres (in the second dimension—illustrated as the y dimension). In particular, the distal end/edge 811—the end that is remote/distal with respect to the transmission surface 842—of one louvre overlaps (or overhangs) the proximal end/edge 812 of the adjacent/ neighbouring louvre in the second dimension, as shown by overlap o. It may be said that the proximal end/edge 812 of one or a pair of neighbouring louvres/louvre slats 810 is in the shadow of the overlap (or overhang) o of the distal end/edge 811 of the other of the pair of neighbouring louvres/louvre slats 810. In consequence, rays of sunlight S received from the sun at high elevation angles (e.g. at very small/substantially normal angle of incidence to the transmission surface) cannot pass between the louvres/louvre slat 810$a$-$e$ so as to reach the transmission surface 842 and be specularly reflected therefrom, as in the comparative example of FIG. 8A. Rather, the optical path of the rays of sunlight S is blocked by one of the louvres 810 and so absorbed or attenuated as shown by the cross X.

Figure 9:
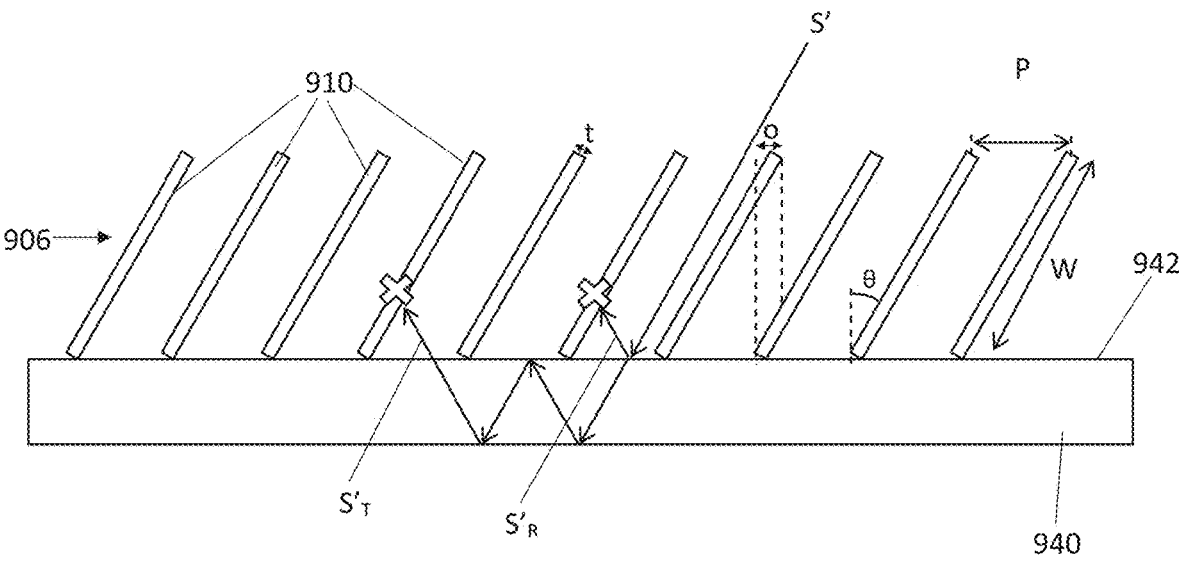
FIG. 9 shows the embodiment of FIG. 8B with incident sunlight from a second elevation angle.
Figure 9:
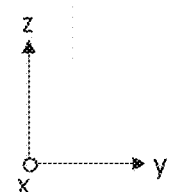

FIG. 9 shows the embodiment of FIG. 8B, in which the sunlight S' is received from the sun at a different/higher elevation angle. In this scenario, sunlight S' is received through the windscreen (not shown) at an angle that enables the light rays to pass between the louvres/louvre slats 910 (e.g. parallel to the sidewalls of the louvre slats 910) and so to be (directly) incident on the transmission surface 942 of the waveguide pupil expander 940. In this scenario, a proportion of the incident sunlight S' may be specularly reflected from the transmission surface 942 as reflected rays S'$_R$. However, due to the parameters of the louvre structure 906, as described herein, the reflected rays S'$_R$ are specularly reflected along an optical path that is blocked by a louvre/ louvre slat 910, and thus absorbed or attenuated as shown by cross X. Furthermore, the remaining proportion of incident sunlight S' may be transmitted through the transmission surface 942 into the waveguide pupil expander 940. In this case, as shown in FIG. 9, the light rays may be internally reflected between the opposed reflective surfaces of the waveguide 940 as shown by arrows (from right to left—the opposite direction to the direction of pupil expansion). At each internal reflection/bounce at the partially reflective-partially transmissive surface 942, some light rays are emitted from the transmission surface 942 as transmitted rays S'$_T$. However, once again, the transmitted rays S'$_T$ are emitted from the transmission surface 942 along an optical path that is blocked by a louvre/louvre slat 910, and thus also absorbed or attenuated as shown by cross X.

Accordingly, in accordance with the embodiment of FIGS. 8B and 9, the optical path of rays of sunlight S, S' incident on the light control layer comprising the louvre structure 806, 906, at substantially all angles of elevation of the sun (from which light can pass through the windscreen), follow an optical path that is blocked, and thus absorbed or attenuated, by at least one of the louvres/louvre slats 810. Thus, the risk of sunlight being reflected towards the viewing area/eye-box and causing glare is reduced/mitigated.

As the skilled person will appreciate, any one or more of the parameters, specifically the width w, thickness t, pitch p and orientation angle θ, of the louvre slats, may be selected to provide the required overlap o, overhang or shadow region, according to application requirements (e.g. orientation of the pupil expander relative to the horizontal, shape of the windscreen and position of the pupil expander with respect to the windscreen in situ).

In addition, the pitch p (or spacing interval) between the louvres in the array of louvres may be selected to minimise diffractive effects on the output image light, in order to avoid adversely affecting the quality of the image at the viewing area. In some embodiments, the louvre pitch, p, is at least two orders of magnitude greater than the wavelength or wavelengths of the image light, I. Typically, the image light comprises visible wavelengths such as red, green and blue wavelengths output by laser light sources. In some examples, the thickness of the louvre slats is in the range of 2 to 250 μm, and preferably less than 170 μm such as in the range 20 to 200 μm. The thickness will be chosen to balance the need for mechanical robustness and maintaining image quality, as discussed below. The pitch (spacing interval) of the louvres slats is in the range of 0.5 to 3 mm, preferably 1 to 2 mm. In some examples, the width of the louvre slats is in the range 2 to 15 mm, and the louvre orientation angle θ is in the range 10° to 45° and preferably 25° to 35°. As the skilled person will appreciate, the length of the slats should be substantially the same as the corresponding dimension of the optical component on which the louvre structure is disposed.

Reducing Occlusions of Image Light

When disposed over an output port of a display system, such as a transmission surface of a waveguide pupil expander, the louvre structure may introduce occluded areas (or simply "occlusions") in the image light of the expanded exit pupil of the display system.

Referring to FIG. 10, the projection axis of the image light I output by the transmission surface 1042 of the waveguide pupil expander 1040 may be at substantially the same angle θ as the orientation of the louvres/louvre slats 1010 relative to the surface normal of the transmission surface 1042.

FIG. 10 shows a first set of parallel rays $T_{J1}$ of image light I emitted at the orientation angle θ of the louvres/louvre slats 1010. The first set of rays $T_{J1}$ thus pass between the louvres 1010, parallel to the sidewalls of the louvres/louvre slats 1010 as shown by arrows, in the direction of the required optical path to the viewing area. However, some of these first set of rays $T_{J1}$ are blocked by the louvres/louvre slats 1010, such as the proximal end/edges thereof. This leads to occluded areas/occlusions 1070 in the projected image light where no image light is present. The size of the occlusions 1070 substantially corresponds to the dimensions of the proximal/distal edge (end face) of the louvre slats 1010, and has the same length as the slat length in the first direction (illustrated as the x direction) and a width corresponding to the slat thickness t which extends generally in the second dimension (illustrated as the y dimension). Thus, the occlusions 1070 of the first set of rays $T_{J1}$ of image light I may be minimised by minimising the thickness t of the louvres/louvre slats 1010. In examples, the thickness of the louvres/louvre slats may be less than 0.17 mm so that the occlusions 1070 are not visible to the viewer at a viewing area/eye-box at approximately 1 metre from the louvre structure 1006. In some embodiments, the thickness is also greater than 5 μm so that diffraction is not caused.

As the skilled person will appreciate, the thickness t of the louvres/louvre slats 1010 should be sufficient for the material thereof to perform the required absorption, attenuation, or diffuse scattering of sunlight to suppress reflections, and so prevent glare, as described herein. Thus, the thickness t of the louvres/louvre slats 1010 should be selected to balance the conflicting needs of (i) minimising the thickness to minimise occlusions in the emitted image light field, and (ii) providing a sufficient thickness to prevent sunlight glare, according to application requirements.

In addition, the image light I may be a diffracted light field comprising diverging ray bundles, for example encoding a hologram comprising angular channels, as described herein. Thus, the light rays output between the louvres/louvre slats 1010 may subtend a range of angles R about a general projection axis of the image light I and thus the orientation angle θ of the louvres/louvre slats 1010, as shown by the example output diverging image ray bundle $I_B$ having a range of light ray angles R.

Accordingly, FIG. 10 shows a second set of rays $T_{J2}$ of image light I emitted at an example maximum angle from the plane parallel to orientation angle θ of the louvres/louvre slats 1010. The light rays at the centre of the second set of rays $T_{J2}$ pass between the louvres 1010, in a direction that is not parallel to the sidewalls of the louvres 1010 as shown by arrows, in the direction of the required optical path to the viewing area. However, the light rays at the periphery of the second set of rays $T_{J2}$ are blocked by the distal end/edge of each of the louvres 1010. This leads to occluded areas/occlusions 1072 in the projected image light where no image light is present. Owing to the angle of the light rays of the second set of rays $T_{J2}$, the size of the occlusions 1072 is slightly greater than the dimensions of the distal edge (end face) of the louvre slats 1010, and thus the size of the occlusions 1072 in the second dimension (illustrated as the y dimension) formed by the first set of rays $T_{J1}$. The occlusions 1072 of the second set of rays $T_{J2}$ of image light I may be minimised by selecting the orientation angle θ of the louvres/louvre slats 1010 at a median angle—midway between the maximum and minimum angles—of the range R of light rays of the light ray bundle of the image light I that is required to be propagated to the viewing area (e.g. according to the required field of view such as from −0.5° to +0.5°).

Example

The inventors conducted simulated experiments, which measured sunlight reflections leading to direct glare and veiling glare from a range of possible sun positions, and thus a range of angles of incidence of sunlight, on the exit surface of a waveguide pupil expander of a head-up display, with and without a light control layer thereon as described above. The light control layer had a louvre structure comprising a one-dimensional array of louvres separated by air.

The louvre structure of the example was an array of stainless steel louvres. Stainless steel has suitable properties, including low (specular) reflectance and mechanical strength/robustness. The array of louvres was substantially uniform, with each louvre having a thickness t of 0.1 mm and a width w of 10 mm. The louvre structure was arranged on the exit surface of the waveguide pupil expander in an array in the dimension of pupil expansion, with a louvre angle θ of 27.3° and a louvre pitch p of 1.5 mm. The measurements were based on a sun luminance of 100, 00 lux.

For veiling glare, with the sun positioned at an elevation angle causing the highest intensity of reflected rays of sunlight propagating indirectly from the waveguide via the internal surface of the windscreen to the eye-box, the inventors found that the addition of the louvre structure led to a reduction in luminance from $5\times10^7$ cd/m$^2$ to <100 cd/m$^2$ (i.e. ×500,000 reduction in luminance). For direct glare, with the sun positioned at an elevation angle causing the highest intensity of reflected rays of sunlight propagating directly from the waveguide to the eye-box, the inventors found that the addition of the louvre structure led to a reduction in luminance from $5\times10^8$ cd/m$^2$ to <500 cd/m$^2$ (i.e. ×1,000,000 reduction in luminance).

Transparent Structures Between Louvres

In the above-described embodiments, the louvre structure comprises an array of louvres/louvre slats separated by air. However, the resulting louvre structure may be fragile, and therefore susceptible to breakage. In addition, the (planar) surface of the optical component, on which the louvre structure is disposed, may be at risk of exposure to particles, fluid or other contaminants. Such contaminants may become trapped on surfaces of, and between, the louvres/louvre slats and are difficult to remove in order to clean the (planar) surface and/or the surfaces of the louvres/louvre slats. In the event of breakage of the louvre structure, or contamination of the optical component on which it is disposed, the quality of the image seen by the viewer may be adversely affected.

Accordingly, in some embodiments, an optically transparent structure is formed between the louvres/louvre slats of the array, as in the first comparative example. Such a structure may improve mechanical strength and robustness and may additionally allow a reduction in the thickness of the louvres/louvre slats (e.g. below 0.1 mm such as 0.05 mm). However, the transparent structure of the embodiments is configured to prevent specular reflection of sunlight from substantially all positions thereon, in particular specular reflection that reaches the viewing area/eye-box of the display system either directly—as "direct glare"- or indirectly via the vehicle windscreen—as "veiling glare". In addition, the configuration of the transparent structure allows image light of the display system to pass through the transparent material between the louvres/louvre slats, without deviation from the required optical path via the windscreen to the viewing area/eye-box.

Figure 11:
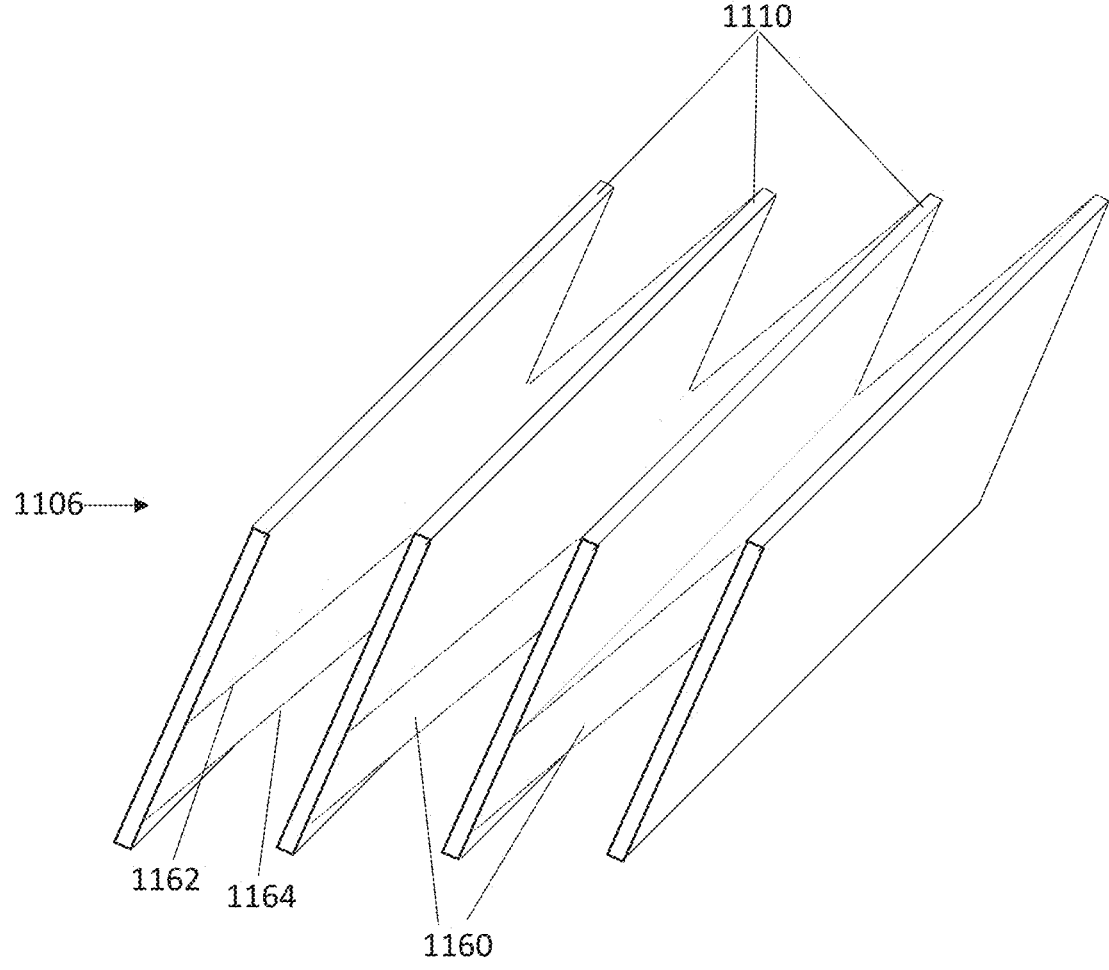
FIG. 11 is a schematic perspective view of a light control layer having a first example transparent structure in accordance with another embodiment.

FIG. 11 shows a first example of a transparent structure 1160 that may be implemented between adjacent pairs of louvres/louvre slats 1110 of the louvre structure 1106 so as to provide mechanical robustness to, and enable cleaning of, the louvre structure 1106.

In the first example, each transparent structure 1160 has a longitudinal rectilinear configuration similar to the shape of the louvre slats 1110 and is arranged at an angle between positions adjacent respective proximal and distal ends/edges of neighbouring pairs of slats 1160 to form a concertina-like configuration. In particular, each transparent structure 1160 has a pair of planar parallel sidewalls 1162, 1164 having a length substantially corresponding to the length of the louvre slats 1110 and a width substantially corresponding to the distance between its position adjacent the proximal end/edge of one of the pair of louvre slats 1110 and its position adjacent the distal end edge of the other one of the pairs of louvre slats 1110.

The angle of inclination a of the surfaces of the sidewalls 1162, 1164 (with respect to the surface normal of the optical component on which the louvre structure is formed) is selected to be sufficiently high (or large—e.g. substantially greater than θ) to prevent specular reflection of sunlight incident on the louvre structure 1106 from substantially all directions/elevation angles from being directed towards the viewing area/eye-box. Specifically $\alpha>\theta$ is such that incident light is specularly reflected from the surfaces of the sidewalls 1162, 1164 along an optical path towards one of the louvres/louvre slats and thus absorbed or attenuated. The skilled person will appreciate that the angle $\alpha$ is selected based on the parameters of the array of louvres, as described herein. Furthermore, since the sidewalls 1162, 1164 of the transparent structures 1160 are substantially planar, light rays output from t (planar) surface of the optical component on which the louvre structure 1106 is formed, such as the transmission surface of a waveguide pupil expander as described herein, propagate through the transparent structure 1160 between the louvres/louvre slats 1110 without deviation from the required optical path to the viewing area/eye-box. The thickness (i.e. distance between the sidewalls 1162, 1164) of the transparent structures 1160, and the optical material from which they are formed, may be selected according to application requirements.

Figure 12A:
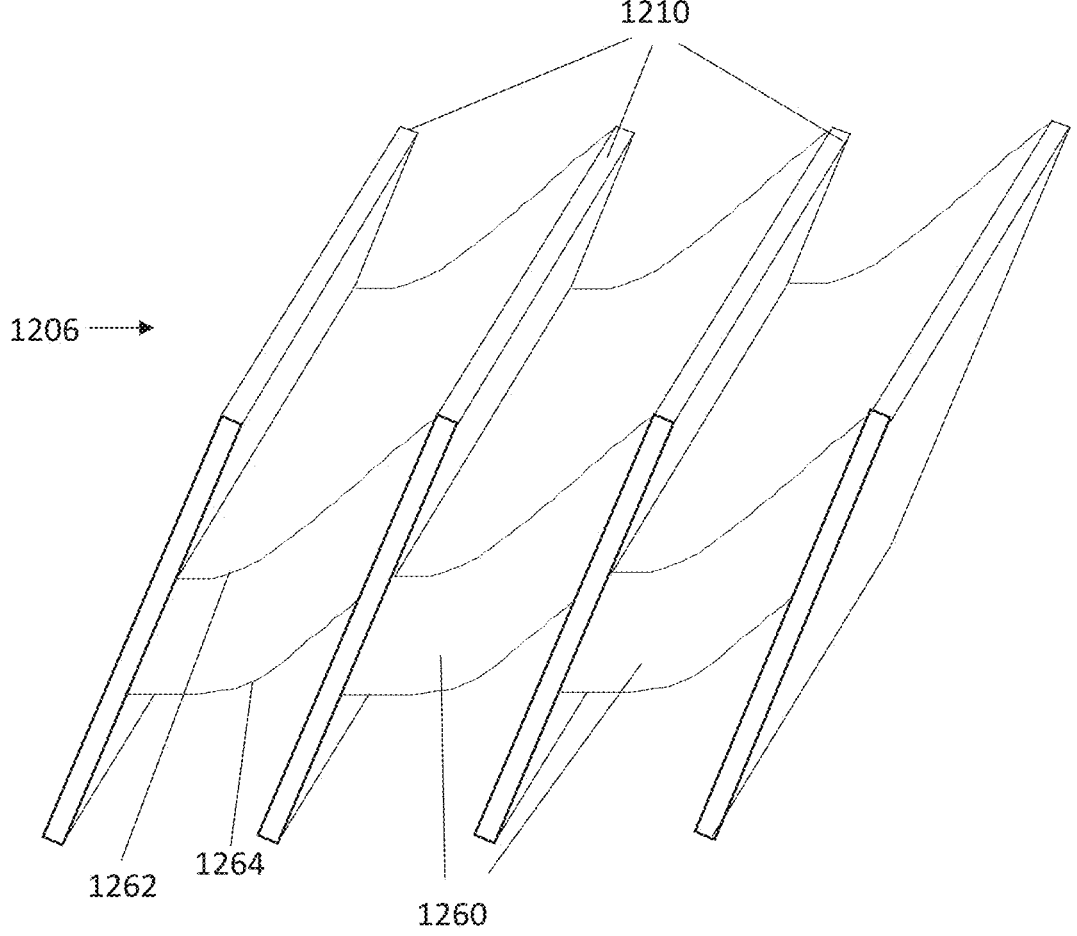
FIG. 12A is a schematic perspective view.
Figure 12B:
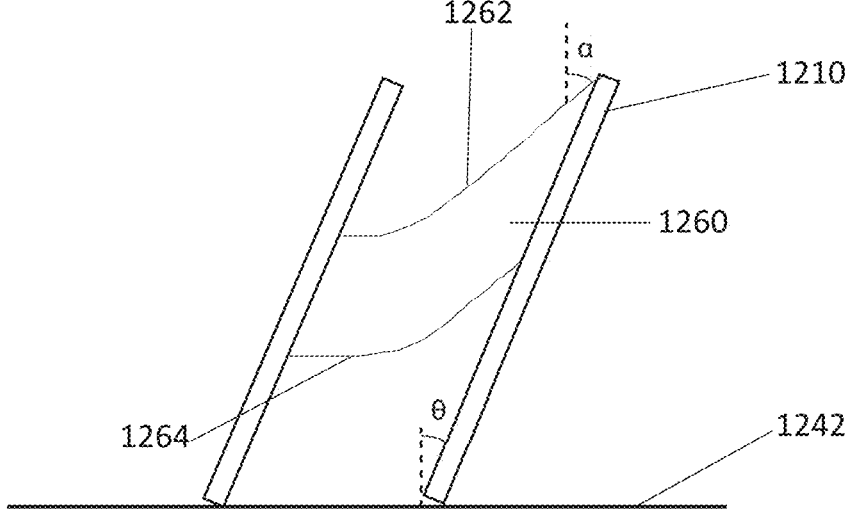
FIG. 12B is a side view, of a light control layer having a second example transparent structure in accordance with yet another embodiment.

FIGS. 12A and 12B show a second example of a transparent structure 1260 that may be implemented between adjacent pairs of louvres/louvre slats 1210 of the louvre structure 1206 (which is arranged on a first surface 1242 of an optical component as shown in FIG. 12B) so as to provide mechanical robustness to, and enable cleaning of, the louvre structure 1206.

In the second example, each transparent structure 1260 has a longitudinal configuration similar to the shape of the louvre slats 1210 and is arranged at an angle between positions adjacent respective proximal and distal ends/edges of neighbouring pairs of louvres/louvre slats 1210 to form a concertina-like configuration. However, in contrast to the first example, each transparent structure 1260 has a pair of curved sidewalls 1262, 1264. The length of each sidewall substantially corresponds to the length of the louvre slats 1210, and the width of each sidewall 1262, 1264 corresponds to the distance of the curve subtended between its positions adjacent the proximal and distal edges/ends of the neighbouring pairs of louvres/louvre slats 1210.

Accordingly, the shape/configuration of the curved surface of an upper sidewall 1262 (the sidewall opposite the (planar) surface of the optical component on which the louvre structure 1206 is formed) of each transparent structure 1260 is inclined upwardly from a position adjacent the proximal end/edge of one louvre slat of a neighbouring pair of louvres/louvre slats to a position adjacent the distal end edge of the other louvre slats of the pair of louvres/louvre slats. The angle $\alpha$ of the curve (in the second dimension with respect to the surface normal) is indicated at a position where the inclination angle is a maximum in FIG. 12B. In examples, the curved surface is configured so that at all positions along the curve are at an angle $\alpha>\theta$ such that incident light is specularly reflected from the surfaces of the sidewalls 1262, 1264 along an optical path towards one of the louvres/louvre slats and thus absorbed or attenuated. The skilled person will appreciate that the configuration of the curved surface is selected to provide the required angle at all positions along the curve is selected based on the parameters of the array of louvres, as described herein. Thus, the shape/configuration of the surface of the upper sidewall 1262 (and optionally the lower sidewall 1264) may be configured so that the inclination angle (with respect to the surface normal plane to the (planar) surface of the optical component on which the louvre structure is formed) at all positions between adjacent louvres/louvre slats 1210 is large/high enough to prevent specular reflection of sunlight incident on the louvre structure 1206 from substantially all directions/sun elevation angles from being directed towards the viewing area/eye-box. Typically, the angle $\alpha$ may decrease in the direction of pupil expansion (as shown from left to right in FIGS. 12A and B). Furthermore, the shape/configuration of the curved surfaces of the sidewalls 1262, 1264 may be selected so that the light rays output from the optical component on which the louvre structure 1206 is formed, such as from the transmission surface of a waveguide pupil expander as described herein, propagate through the transparent structure 1260 without deviation from the required optical path to the viewing area/eye-box. The (optionally variable) thickness (i.e. distance between the sidewalls 1262, 1264) of the transparent structures, and the optical material from which they are formed, may be selected according to application requirements. In embodiments, the sidewalls 1262 and 1264 are substantially parallel.

As the skilled person will appreciate, the curvature of the respective surfaces of the upper and lower sidewalls 1262, 1264 of the transparent structure 1260 is selected according to application requirements, and may be the same or different for each curved sidewall 1262, 1264. For instance, in some examples, the curved surfaces of the sidewalls 1262, 1264 may be different and may be optimised to minimise the distortion of image light propagating, potentially at different angles, through the transparent structure 1260, whilst being configured with the same shape as a conventional "glare trap" to prevent specular reflection of sunlight (e.g. at low elevation angles), as well known in the art.

The transparent structures 1260 with curved sidewalls of the second example may be configured to have greater mechanical strength and robustness compare to the transparent structures 1160 with planar sidewalls of the first example.

In the described embodiments, the light control layer is disposed directly on the transmission surface/partially transmissive-partially reflective surface of a second replicator/waveguide pupil expander as described herein. As the skilled person will appreciate, the light control layer may equally be formed on another layer, coating or film of the waveguide pupil expander, such as a turning film on the transmission surface/output port of the waveguide pupil expander, or on another similar optical component of a display system.

In addition, in the described embodiments, the pitch between the louvres/louvre slats of the array of louvres, and the thickness of the individual louvres, is uniform. As the skilled person will appreciate, the pitch between the louvres may be variable, for instance according to position along the second dimension of the array (i.e. in the dimension of pupil expansion of a waveguide pupil expander as described herein). In addition, the thickness of the individual louvres may be variable. For example, the louvres may be tapered in a direction from the proximal end/edge to the distal end/edge thereof, resulting in different orientation angles of the sidewalls thereof. This may be used for further control sunlight reflections and glare and/or allow the propagation of light rays of image light on the required optical path to the viewing area/eye-box.

Example Image Projectors

An image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by reference). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channeling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the deliver of hologram light channels, and their replicas, to the eye-box. Each aperture or window may comprise a plurality of liquid crystal cells or pixels.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A display system configured for the transmission of image light to a viewing area, the display system comprising an optical component, the optical component being reflective, the display system further comprising:

a light control layer disposed on a first surface of the optical component on an optical path of sunlight to the optical component, wherein the first surface has a first dimension and a second dimension, wherein the light control layer comprises a louvre structure comprising an array of louvres, each louvre extending longitudinally in the first dimension of the first surface, the louvres being spaced apart by a louvre pitch in the second dimension of the first surface;

wherein each louvre has a width defined between a proximal end adjacent the first surface and a distal end;

wherein each louvre is arranged at an orientation angle $\theta$ relative to the first surface, wherein a separation in the second dimension between adjacent louvres is such that the distal end of one louvre overlaps the proximal end of the adjacent louvre; and wherein each pair of adjacent louvres of the light control layer is separated by a transparent structure, each transparent structure having opposing first and second surfaces spaced from the first surface of the optical component, each transparent structure being arranged such that the first and second surfaces are angled relative to the adjacent louvres to prevent specular reflection of sunlight incident on the optical component from being directed to the viewing area.

2. The display system as claimed in claim 1 wherein the louvres comprise a material having one or more of: high absorption; high attenuation; low specular reflectivity and high diffusivity of visible light.

3. The display system as claimed in claim 1 wherein the louvre structure comprises a one-dimensional array of parallel longitudinal slats, wherein each slat has a length, a width, and a thickness that is defined by a pair of sidewalls.

4. The display system as claimed in claim 1 wherein the sidewalls of the louvres extend substantially in a third dimension, orthogonal to the first and second dimensions of the first surface.

5. The display system as claimed in claim 4 wherein the angle of orientation of the sidewalls of the louvres is such that image light output from the first surface of the optical component follows an optical path between the louvres, without deviation.

6. The display system as claimed in claim 1 wherein each transparent structure is arranged such that image light output from the first surface of the optical component follows an optical path through the transparent structure between the louvres without deviation.

7. The display system as claimed in claim 1 wherein the first and second surfaces of each transparent structure are substantially planar surfaces arranged at an angle to prevent specular reflection of sunlight on an optical path that passes between the distal end of the louvres.

8. The display system as claimed in claim 1 wherein the first and second surfaces of each transparent structure have a curved configuration arranged to prevent specular reflection of sunlight onto an optical path that passes between the distal end of the louvres.

9. The display system as claimed in claim 1 wherein the optical component is a waveguide pupil expander for output of image light of the display system to the viewing area of the display system.

10. The display system as claimed in claim 9 wherein a thickness of each of the louvres is arranged to minimise the occluded areas of image light output by the waveguide pupil expander.

11. The display system as claimed in claim 1 wherein the orientation angle $\theta$ of the louvres is selected to optimise the transmission of image light to the viewing area.

12. The display system as claimed in claim 11 wherein the orientation angle of one or more louvres is a midpoint between the maximum and minimum angle of output image light at the position of the respective louvres or wherein the orientation angle $\theta$ of the louvres is in a plane containing the gut ray/projection axis of the output image light at the position of the respective louvres.

13. The display system as claimed in claim 1 wherein the pitch of the louvres in the array of louvres is selected to minimise diffractive effects on the image light as perceived at a viewing area of the display system.

14. A head-up display comprising the display system as claimed in claim 1.

15. The display system according to claim 1, wherein the second dimension of the first surface of the optical component is orthogonal to the first dimension of the first surface of the optical component.

16. The display system according to claim 1, wherein the first and second surfaces of the transparent structure are arranged at an inclination angle $\alpha$ with respect to the first surface of the optical component, the inclination angle $\alpha$ being greater than the orientation angle at all positions upon which sunlight may be incident.

17. The display system according to claim 1, wherein the first surface of the optical component is reflective.

18. A display system configured for the transmission of image light to a viewing area, the display system comprising an optical component, the optical component being reflective surface, the display system further comprising:

a light control layer disposed on a first surface of the optical component on an optical path of sunlight to the optical component, wherein the light control layer comprises a louvre structure comprising an array of louvres;

wherein each louvre has a width defined between a proximal end adjacent the first surface and a distal end;

wherein each louvre is arranged at an orientation angle $\theta$ relative to the first surface, and wherein the array of louvres includes between each pair of adjacent louvres of the array a transparent structure, each transparent structure having opposing first and second surfaces spaced from the first surface of the optical component, the transparent structure being arranged such that the first and second surfaces are angled relative to the adjacent louvres to prevent specular reflection of sunlight incident on the optical component from being directed to the viewing area.

19. A head-up display comprising the display system as claimed in claim 18.

* * * * *